(12) United States Patent
Tomlinson et al.

(10) Patent No.: US 7,874,162 B2
(45) Date of Patent: Jan. 25, 2011

(54) SUPERCRITICAL STEAM COMBINED CYCLE AND METHOD

(75) Inventors: Leroy Omar Tomlinson, San Diego, CA (US); Raub Warfield Smith, Saratoga, NY (US); Jatila Ranasinghe, Simpsonville, SC (US); Seyfettin Can Gülen, Niskayuna, NY (US); Diego Fernando Rancruel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 782 days.

(21) Appl. No.: 11/905,846

(22) Filed: Oct. 4, 2007

(65) Prior Publication Data

US 2009/0090111 A1    Apr. 9, 2009

(51) Int. Cl.
*F02C 6/00* (2006.01)
*F01K 7/00* (2006.01)
(52) U.S. Cl. .................. 60/772; 60/39.182; 122/7 B
(58) Field of Classification Search ............. 60/772, 60/773, 39.182; 122/7 R, 7 B
See application file for complete search history.

(56) References Cited

U.S. PATENT DOCUMENTS

| | | | |
|---|---|---|---|
| 4,253,300 A | 3/1981 | Willyoung | |
| 4,896,496 A | 1/1990 | Zervos | |
| 5,412,937 A | 5/1995 | Tomlinson et al. | |
| 5,428,950 A | 7/1995 | Tomlinson et al. | |
| 5,491,971 A | 2/1996 | Tomlinson | |
| 5,570,578 A * | 11/1996 | Saujet et al. | 122/1 R |
| 5,577,377 A | 11/1996 | Tomlinson | |
| 5,628,179 A | 5/1997 | Tomlinson | |
| 5,647,199 A | 7/1997 | Smith | |
| RE36,497 E | 1/2000 | Tomlinson | |
| RE36,524 E | 1/2000 | Tomlinson | |
| 6,062,017 A * | 5/2000 | Liebig | 60/39.182 |
| 6,173,563 B1 | 1/2001 | Vakil et al. | |
| 6,220,013 B1 | 4/2001 | Smith | |
| 6,389,794 B2 | 5/2002 | Ranasinghe et al. | |
| 6,397,575 B2 | 6/2002 | Tomlinson et al. | |
| 6,412,285 B1 | 7/2002 | Ranasinghe et al. | |
| 6,474,069 B1 | 11/2002 | Smith | |
| 6,519,944 B2 | 2/2003 | Smith | |
| 7,168,233 B1 | 1/2007 | Smith et al. | |
| 2004/0148941 A1 * | 8/2004 | Wylie | 60/39.182 |
| 2005/0150230 A1 * | 7/2005 | Rollins, III | 60/39.182 |

OTHER PUBLICATIONS

Galopin, J.F.; "Going supercritical: once-through is the key"; Modern Power Systems; Dec. 20, 1998; 10 pages.

* cited by examiner

*Primary Examiner*—Ted Kim
(74) *Attorney, Agent, or Firm*—Nixon & Vanderhye PC

(57) ABSTRACT

A supercritical steam combined cycle system including a gas turbine; a supercritical steam turbine system including a supercritical section, a high pressure section, an intermediate pressure section and at least one low pressure section; and a supercritical steam heat recovery steam generator (HRSG) for receiving exhaust gas from the gas turbine for heating fluid from the steam turbine system. The HRSG includes a supercritical evaporator arranged to supply steam to a superheater between the supercritical evaporator and the inlet of the HRSG and a reheater receiving cold reheat steam from and returning reheated steam to the steam turbine system. The reheater includes a first section disposed downstream of and a second section disposed upstream of the supercritical evaporator along the exhaust gas flow path. Cool reheat steam from the steam turbine system is received by the first reheater section and steam leaving the first reheater section is supplied to the second reheater section upstream of the supercritical evaporator.

20 Claims, 3 Drawing Sheets

SUPERCRITICAL STEAM COMBINED CYCLE AND METHOD

BACKGROUND OF THE INVENTION

The invention relates to a method of heat integration and optimum configuration for a single or multi pressure level Supercritical Steam Heat Recovery Steam Generator (HRSG) with reheat used in combined cycle applications.

The most commonly applied steam bottoming cycles for combined cycle power plants currently being installed and operated are reheat steam cycles with sub-critical steam generation at multiple pressures and a single reheater located in the heat recovery steam generator gas path upstream of the high pressure evaporator. This combined cycle configuration was first described in a paper, "GE MS7001FCombined-Cycle Power Plant" by Leroy O. Tomlinson, Roger O. Anderson and Raub W. Smith that was presented to the American Power Conference in April, 1987 and published in the proceedings of this conference. The current state of the art irreversibility losses are ~10% of GT exhaust energy.

Performance of combined cycles with the reheat, sub-critical steam cycle with steam generation at multiple pressures can be improved by incorporating a two-stage reheater as described in U.S. Pat. No. 6,220,013 B1, Multiple Pressure Reheat Combined Cycle with Multiple Reheaters by Raub W. Smith.

Supercritical steam cycles have been designed for combined cycles with a single reheater in the heat recovery steam generator gas path upstream of the steam generating section as described in the article entitled "Going Supercritical—Once-Through is the Key" published in Modern Power Systems, December, 1998.

The performance of the current bottoming cycle technology (mostly sub-critical pressure) is limited by the pinch points which occur in the HRSG evaporators due to constant temperature phase change from water to steam, with heat equal to the latent heat of vaporization required for this process. This discontinuity in temperature causes a mismatch between the gas turbine exhaust gas and the water/steam heating, resulting in significant irreversibility in the cycle.

The fundamental advantage of supercritical combine cycles originates from the physics of fluids at supercritical conditions. Water above the supercritical pressure behaves in a different manner when heated. At supercritical conditions, the water temperature in the boiler increases continuously without discontinuities due to phase change. This behavior allows for better matching of the gas turbine exhaust gases with the water/steam for less irreversibility during energy transfer. This behavior and benefit has been known in the past, but the performance gains were not big enough to justify the additional cost in combined cycle applications.

BRIEF DESCRIPTION OF THE INVENTION

The invention disclosed herein further reduces the irreversibility of energy transfer with optimum placement of HRSG heat transfer sections, allowing significantly better combined cycle performance from supercritical cycles. This additional performance will substantially enhance the economic feasibility of supercritical steam cycle based combined cycles.

Thus the invention may be embodied in a supercritical combined cycle system comprising a gas turbine; a steam turbine system including a supercritical section, a high pressure section, an intermediate pressure section and at least one low pressure section; and a supercritical steam heat recovery steam generator for receiving exhaust gas from the gas turbine for heating fluid from the steam turbine system, said gas turbine exhaust gas flowing along an exhaust gas flow path from an entry end to an exit end of the heat recovery steam generator, wherein said heat recovery steam generator includes a supercritical evaporator arranged to supply steam to a superheater between the supercritical evaporator and the entry end of the heat recovery steam generator, steam exiting said superheater being returned to the supercritical section of the steam turbine, and a reheater disposed along said exhaust gas flow path, said reheater receiving cold reheat steam from the steam turbine system and returning reheated steam to the steam turbine system, wherein the reheater includes at least first and second sections, said first reheater section being disposed downstream of said second reheater section along said exhaust gas flow path through said heat recovery steam generator, wherein said first section of said reheater is disposed downstream of said supercritical evaporator along said exhaust gas flow path and said second section of said reheater is disposed upstream of said supercritical evaporator along said exhaust gas flow path, and wherein said first and second sections of said reheater are disposed in series flow such that cool reheat steam from the steam turbine system is received by said first section of said reheater and steam leaving the first section of the reheater is supplied to said second section of said reheater.

The invention may be further embodied in a method of reheating cold steam in a supercritical steam combined cycle system including a gas turbine; a steam turbine system including a supercritical section, a high pressure section, an intermediate pressure section and at least one low pressure section; and a supercritical steam heat recovery steam generator for receiving exhaust gas from the gas turbine for heating fluid from the steam turbine system, said heat recovery steam generator including a supercritical evaporator arranged to supply steam to a superheater between the supercritical evaporator and the gas entry end of the heat recovery steam generator, steam exiting said superheater being returned to the supercritical section of the steam turbine, and a reheater disposed along said exhaust gas flow path, said reheater receiving cold reheat steam from the steam turbine system and returning reheated steam to the steam turbine system, wherein the reheater includes at least first and second reheater sections, said first reheater section being disposed downstream of said second reheater section along said exhaust gas flow path through said heat recovery steam generator, the method comprising: flowing steam including a cold reheat steam flow from said steam turbine system to said first reheater section of said heat recovery steam generator disposed downstream of said supercritical evaporator with respect to said flow of said exhaust gases, thereafter flowing said steam to said second reheater section of said heat recovery steam generator disposed upstream of said supercritical evaporator with respect to said flow of said exhaust gases, and thereafter flowing said steam to said steam turbine system.

DETAILED DESCRIPTION OF THE INVENTION

The current practice of optimal reheat configuration for single pressure or multi pressure supercritical steam cycles is with the reheat section of the HRSG placed upstream of the "HP_EVA OTB" (high pressure supercritical evaporator once through boiler) section with respect to the exhaust gas flow.

An embodiment of the present invention provides a two stage reheat configuration, with one reheat section upstream, and the other downstream of the phase change point (water to steam transition at critical steam temperature) of the high pressure (supercritical) HRSG section.

Figure 1:
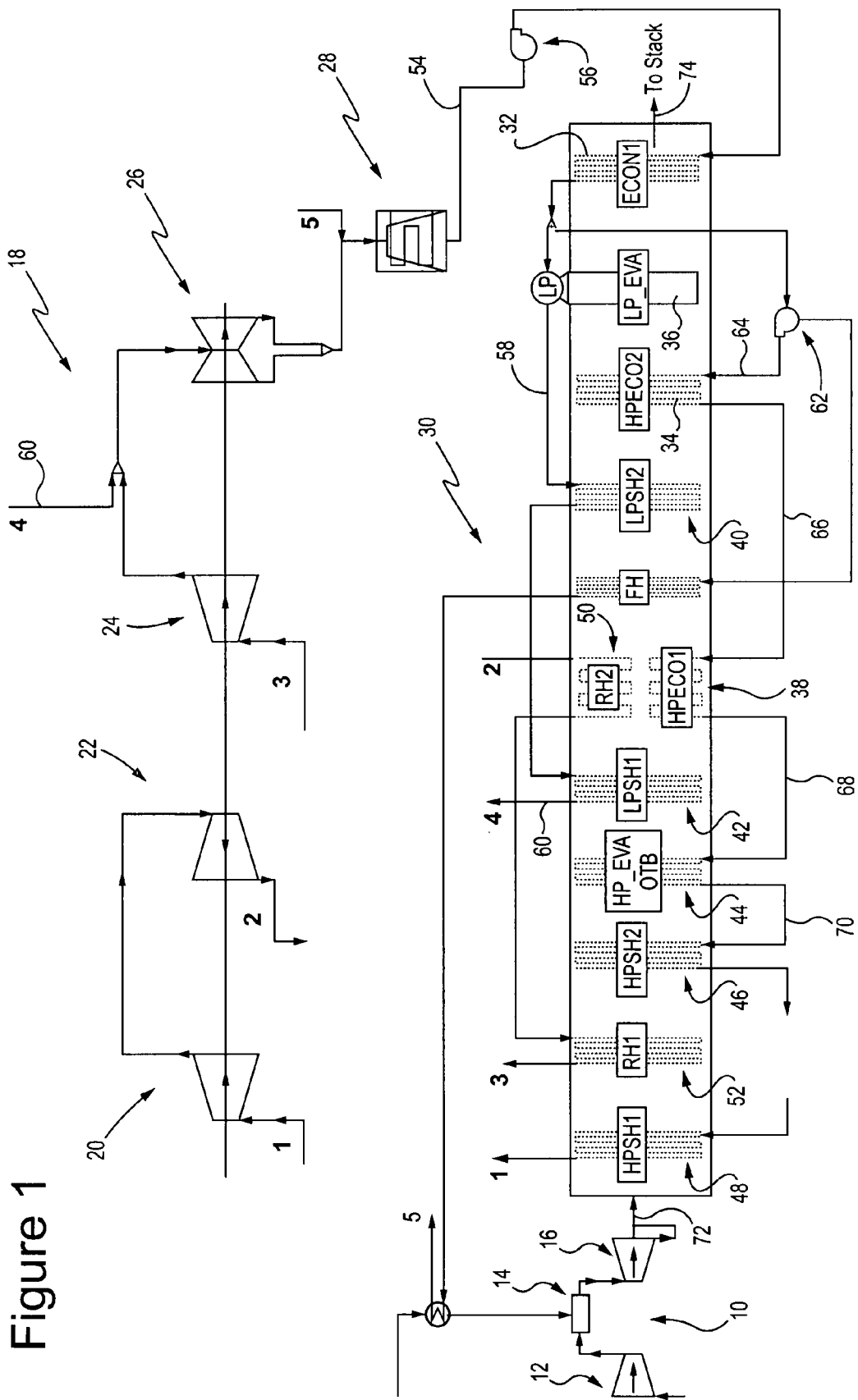
FIG. 1 schematically illustrates an example implementation of the invention.

The inventive concept may be incorporated in a single pressure or a multi-pressure supercritical steam cycle. A schematic of a two pressure supercritical steam cycle power generation system embodying the invention is shown in FIG. 1.

This example includes a gas turbine system 10 comprising a compressor 12, a combustion system 14, a gas turbine 16, and a steam turbine system 18 including a supercritical section 20, a high pressure section 22, an intermediate pressure section 24, and one or more low pressure sections 26, with multiple steam admission points at different pressures. The low pressure exhausts into a condenser 28. The gas turbine 10 and steam turbine 18 drive a generator (not shown) and may be arranged in tandem, on a single shaft, or in a multi-shaft configuration where the gas turbine and steam turbine drive separate loads.

The steam turbine system 18 is associated with a two-pressure HRSG 30 which includes low pressure (LP) and high pressure (HP) economizers 32,34, respectively, a LP evaporator 36, a further HP economizer 38, LP superheaters 40,42, an HP supercritical evaporator OTB (supercritical evaporator once through boiler) 44, an HP superheater section 46, and a final HP superheater section 48. Note that as used herein the "supercritical evaporator" section of the HRSG is defined as a heat transfer surface that heats the supercritical fluid from below the critical temperature to above the critical temperature. No evaporation (phase change) takes place as such since the fluid is above the critical pressure.

According to an example embodiment of the invention, two stages of re-heating are implemented. The first reheating section 50 (RH2) is placed downstream of the "HP_EVA OTB" high pressure HRSG phase change section 44. In the illustrated example embodiment, the first re-heating section 50 (RH2) is set in parallel with the HP ECO 1 labeled as element 38. Although a parallel arrangement is shown in this figure, similar thermodynamic benefit can be achieved with an intertwined arrangement with alternate re-heater and economizer tube rows in series. The inlet to this HRSG section 50 is the cool reheat steam exhausted from the HP turbine 22 at 2. The steam exiting this section is heated below the Critical Temperature ($T_{crit}$) in HRSG section 50 (RH2). Next, the steam is directed to the second reheating section 52 (RH1) located upstream of "HP_EVA OTB". In the illustrated example embodiment, the second reheating section 52 is located between the HP super-heaters 48 and 46. However, the invention is not limited to that location of the second reheating section 52.

Condensate is fed from condenser 28 to the HRSG 30 via conduit 54 with the aid of condensate pump 56. The condensate subsequently passes through the low pressure (LP) economizer 32 and into the LP evaporator 36. Steam from the LP evaporator 36 is fed via conduit 58 to the LP superheaters 40,42 and then returned at 4 to the low pressure section 26 of the steam turbine 18 via conduit 60 and appropriate LP admissions stop/control valve(s) (not shown).

Feedwater with the aid of feedwater pump(s) 62 passes through the HP economizers 34,38 via conduits 64, 66. Condensate in the HP economizer 38 is passed to the HP supercritical evaporator 44 via conduit 68. Steam exiting the HP supercritical evaporator passes via conduit 70 through the HP superheater sections 46,48 and is returned to the supercritical section 20 of the steam turbine 18 at 1 via appropriate stop/control valves (if required, not shown). Cool reheat steam exhausted from the HP section 22 of the steam turbine 18 at 2 is sent through reheaters 50 and 52 as described above. The reheated steam is returned to the IP section of the steam turbine at 3 (via appropriate stop/control valves not shown).

Heat is provided to the HRSG by the exhaust gases from gas turbine introduced into the HRSG via conduit 72, which exit the HRSG to a stack (not shown) via conduit 74. More specifically, the exhaust from the gas turbine enters the HRSG 30 where it encounters high pressure superheater 48, reheater section 52 (RH1) and high pressure superheater 46, all disposed upstream of the HP supercritical evaporator 44 with respect to the direction of gas flow. The coldest reheater section 50 (RH2) is downstream of the HP supercritical evaporator 44. In the illustrated example embodiment, the exhaust 2 from the HP section 22 of the steam turbine 18 is supplied to the heater section 50, as mentioned above. In the illustrated example embodiment, the low pressure superheater 42 is disposed between the reheater section 50 and the HP supercritical evaporator 44.

As shown by the following example, the two pressure level supercritical cycle (with HP supercritical) with reheat below the critical temperature yield better performance than the traditional subcritical three pressure reheat cycle or a supercritical cycle without a portion of the reheat downstream of the supercritical evaporator section in the gas path. The HP HRSG operates at supercritical pressure with the supercritical steam turbine inlet throttle pressure being 4300 psia. Steam from the supercritical steam turbine is admitted to the HP steam turbine (the supercritical and HP steam turbines can be a single turbine although two turbines are shown here). The HP steam turbine outlet temperature is 460° F. The first reheating section 50 (RH2) outlet temperature was set to 655° F. The inlet and outlet temperatures of the RH2 and the HP Econ 1 are matched. The RH1 outlet temperature was set to 1050° F.

The proposed arrangement results in the increase of the combine cycle net efficiency by +0.63% points, with an increased net power output of +0.97% when compared to a Three (3) Pressure Subcritical Combined Cycle with Reheat. The HRSG area increase is estimated to be ~35%. The IP and LP steam turbines admission pressure were kept the same as the baseline case; therefore no changes in IP and LP steam turbines are required. The HP steam turbine can be split into a supercritical steam turbine with an inlet throttle pressure of 4300 psia and a HP section with an inlet throttle pressure in the range of a conventional HP steam turbine, as shown in FIG. 1. A second option is to integrate the supercritical and the HP steam turbines into a single piece of equipment (SC-HP steam turbine). Additional auxiliary power required by additional equipment (e.g. SC pressure pumps) was taken into account in the calculations. The stack gases temperature is 177.2° F.

Figure 2:
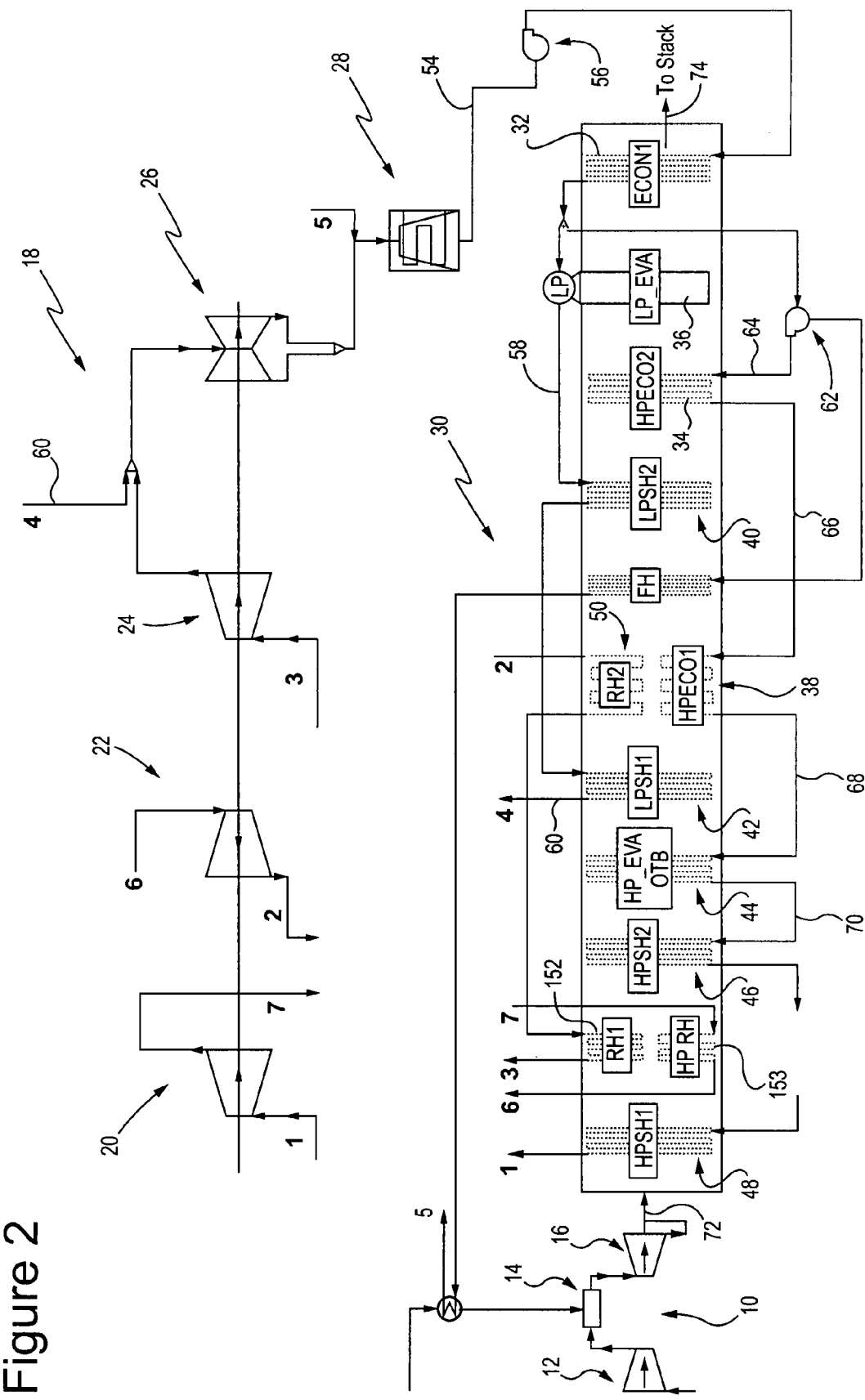
FIG. 2 schematically illustrates another example embodiment of the invention.

FIG. 2 shows an alternate embodiment of the invention wherein double reheat is again implemented. In this embodiment, the exhaust 7 from the supercritical steam turbine 20 is reheated in an HRSG section 153 parallel to the second reheat section 152 and then enters HP steam turbine 22 at 6. In this embodiment, as in the embodiment of FIG. 1, the second reheat system 152 is disposed between HP superheaters 48,46 although the invention is not to be limited to so locating that section. For this double reheat cycle, as noted a parallel arrangement of the high-pressure reheater 153 with the second stage 152 of the low-pressure reheater is shown. However, similar thermodynamic benefit can be achieved with an intertwined arrangement with alternate high-pressure reheater and second stage low-pressure reheater tube rows in series. The embodiment of FIG. 2 otherwise corresponds to the embodiment of FIG. 1 and the corresponding parts are correspondingly numbered, but are not described again with reference to FIG. 2.

Figure 3:
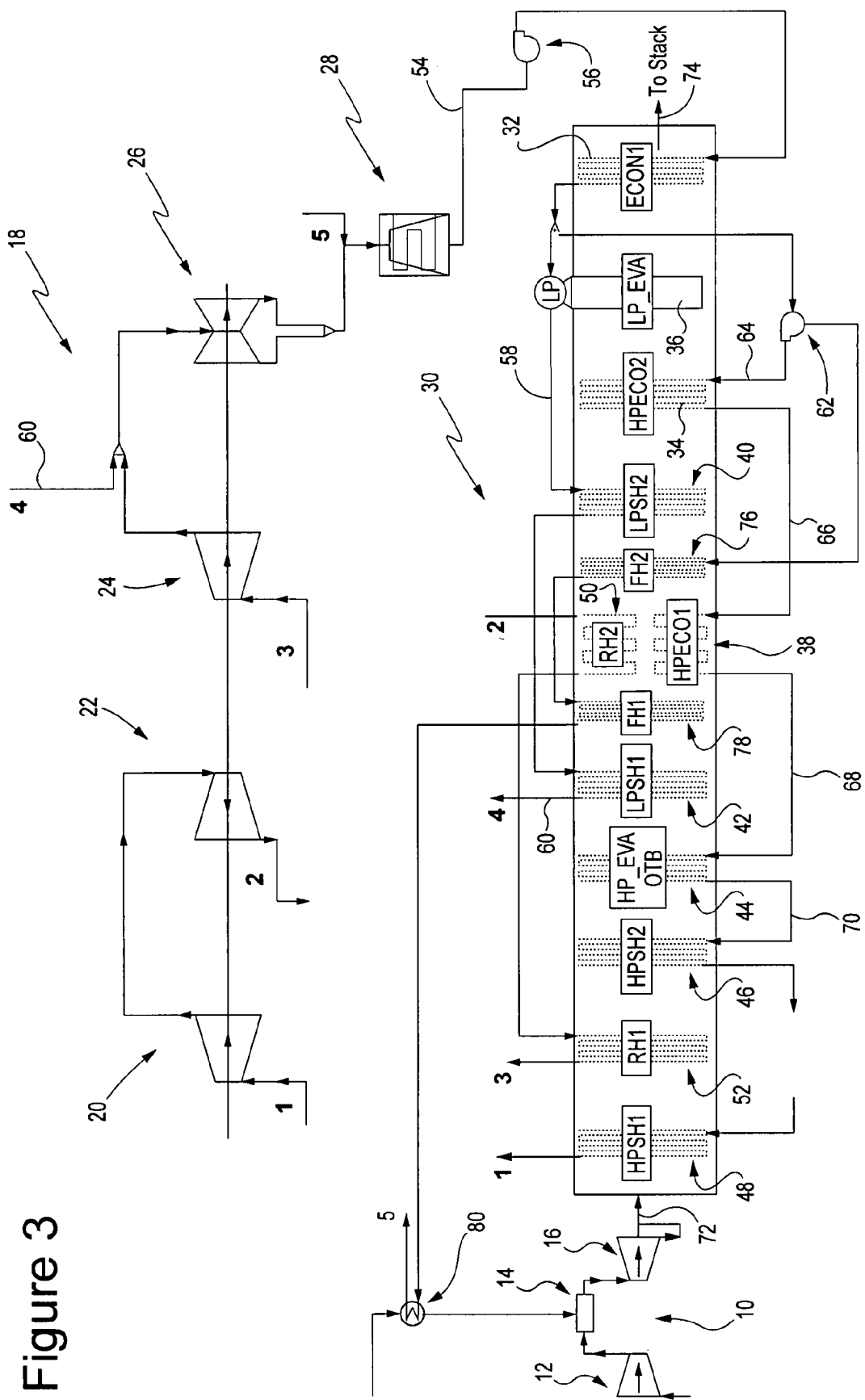
FIG. 3 schematically illustrates yet another embodiment of the invention.

FIG. 3 illustrates yet another alternate implementation of the invention. In the FIG. 3 embodiment, an HRSG economizer section 78 for heating water used for gas turbine fuel gas heating in heat exchanger 80 is provided downstream of "HP_EVA OTB" 44 and upstream of the first stage reheater (RH2) 50. This will allow for efficient fuel gas heating up to the 600° F. range. In the illustrated embodiment, a second HRSG economizer section 76 is provided downstream of the first stage reheater (RH2). Thus the high pressure feed water pump 62 directs water for fuel heating to the FH2 section 76 from which it is directed to the upstream of FH1 section 78 and then on to the heat exchanger 80 for heating the fuel feed to the combustor 14. The embodiment of FIG. 3 otherwise corresponds to the embodiment of FIG. 1 and the corresponding parts are correspondingly numbered, but are not described again with reference to FIG. 3.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A supercritical steam combined cycle system comprising:
    a gas turbine;
    a supercritical steam turbine system including a supercritical section, a high pressure section, an intermediate pressure section and at least one low pressure section; and
    a supercritical steam heat recovery steam generator for receiving exhaust gas from the gas turbine for heating fluid from the steam turbine system, said gas turbine exhaust gas flowing along an exhaust gas flow path from an entry end to an exit end of the heat recovery steam generator,
    wherein said heat recovery steam generator includes a supercritical evaporator arranged to supply supercritical steam to a superheater between the supercritical evaporator and the entry end of the heat recovery steam generator, steam exiting said superheater being returned to the supercritical section of the steam turbine, and a reheater disposed along said exhaust gas flow path, said reheater receiving cold reheat steam from the steam turbine system and returning reheated steam to the steam turbine system,
    wherein the reheater includes at least first and second sections, said first reheater section being disposed downstream of said second reheater section along said exhaust gas flow path through said heat recovery steam generator,
    wherein said first section of said reheater is disposed downstream of said supercritical evaporator along said exhaust gas flow path and said second section of said reheater is disposed upstream of said supercritical evaporator along said exhaust gas flow path, and
    wherein said first and second sections of said reheater are disposed in series flow such that cool reheat steam from the steam turbine system is received by said first section of said reheater and steam leaving the first section of the reheater is supplied to said second section of said reheater.

2. A combined cycle system as in claim 1, wherein said supercritical evaporator is defined as the heat transfer surface that heats the supercritical fluid from below the critical temperature to above the critical temperature and further comprising a low pressure evaporator downstream of said high pressure supercritical evaporator along said exhaust gas flow path.

3. A combined cycle system as in claim 2, wherein said superheater is a high pressure superheater and further comprising a low pressure superheater, said steam from said low pressure evaporator flowing to the low pressure superheater.

4. A combined cycle system as in claim 3, wherein steam from said low pressure superheater is admitted to a low pressure section of the steam turbine system.

5. A combined cycle system as in claim 1, wherein said first section of said reheater receives cool reheat steam from the high pressure section of the steam turbine system and the second section of said reheater returns reheated steam to the intermediate pressure section of the steam turbine system.

6. A combined cycle system as in claim 1, wherein reheated steam from said reheater is returned to an intermediate pressure section of the steam turbine system.

7. A combined cycle system as in claim 1, wherein the first section of said reheater is disposed in parallel with a high pressure economizer, condensate from said high pressure economizer being conducted to said supercritical evaporator.

8. A combined cycle system as in claim 1, wherein said second section of said reheater is disposed in parallel with a high pressure reheat section receiving reheat steam from the supercritical section of the steam turbine system and returning the reheated steam to the high pressure section of the steam turbine system.

9. A combined cycle system as in claim 1, further comprising an economizer section for heating water used for heating gas turbine fuel gas in a heat exchanger, said economizer section being provided downstream of said supercritical evaporator.

10. A combined cycle system as in claim 9, wherein said economizer section comprises an economizer section disposed downstream of said supercritical evaporator and upstream of said first reheater section and a second economizer section provided downstream of said first reheater section, and wherein said reheated steam from said first reheater is routed to said second reheater and then returned to an intermediate pressure section of the steam turbine system.

11. A method of reheating cold steam in a supercritical steam combined cycle system including a gas turbine; a supercritical steam turbine system including a supercritical section, a high pressure section, an intermediate pressure section and at least one low pressure section; and a supercritical steam heat recovery steam generator for receiving exhaust gas from the gas turbine for heating fluid from the steam turbine system, said heat recovery steam generator including a supercritical evaporator arranged to supply steam to a supercritical superheater between the supercritical evaporator and the entry end of the heat recovery steam generator, steam exiting said superheater being returned to the supercritical section of the steam turbine, and a reheater disposed along said exhaust gas flow path, said reheater receiving cold reheat steam from the steam turbine system and returning reheated steam to the steam turbine system, wherein the reheater includes at least first and second reheater sections, said first reheater section being disposed downstream of said second reheater section along said exhaust gas flow path through said heat recovery steam generator, the method comprising:

flowing steam including a cold reheat steam flow from said steam turbine system to said first reheater section of said heat recovery steam generator disposed downstream of said supercritical evaporator with respect to said flow of said exhaust gases, thereafter flowing said steam to said second reheater section of said heat recovery steam generator disposed upstream of said supercritical evaporator with respect to said flow of said exhaust gases, and thereafter flowing said steam to said steam turbine system.

12. A method as in claim 11, wherein said supercritical evaporator is defined as the heat transfer surface that heats the supercritical fluid from below the critical temperature to above the critical temperature and further comprising a low pressure evaporator downstream of said high pressure supercritical evaporator along said exhaust gas flow path.

13. A method as in claim 12, wherein said superheater is a high pressure supercritical superheater and further comprising a low pressure superheater, steam from said low pressure evaporator flowing to the low pressure superheater.

14. A method as in claim 13, wherein steam from said low pressure superheater is admitted to a low pressure section of the steam turbine system.

15. A method as in claim 11, wherein said first section of said reheater receives cool reheat steam from the high pressure section of the steam turbine system and the second section of said reheater returns reheated steam to the intermediate pressure section of the steam turbine system.

16. A method as in claim 11, wherein reheated steam from said reheater is returned to an intermediate pressure section of the steam turbine system.

17. A method as in claim 11, wherein the first section of said reheater is disposed in parallel with a high pressure economizer, condensate from said high pressure economizer being conducted to said supercritical evaporator.

18. A method as in claim 11, wherein said second section of said reheater is disposed in parallel with a high pressure reheat section receiving reheat steam from the supercritical section of the steam turbine system and returning the reheated steam to the high pressure section of the steam turbine system.

19. A method as in claim 11, further comprising an economizer section for heating water used for heating gas turbine fuel gas in a heat exchanger, said economizer section being provided downstream of said supercritical evaporator.

20. A method as in claim 19, wherein said economizer section comprises an economizer section disposed downstream of said supercritical evaporator and upstream of said first reheater section and a second economizer section provided downstream of said first reheater section, and wherein said reheated steam from said reheater is routed to a second reheater upstream of the supercritical evaporator and then returned to an intermediate pressure section of the steam turbine system.

* * * * *